Dec. 15, 1959  N. E. ZIEGE  2,917,077
EXCESS FLOW CHECK VALVE
Filed Nov. 9, 1953

INVENTOR.
N. E. ZIEGE
BY Hudson & Young
ATTORNEYS

United States Patent Office 2,917,077
Patented Dec. 15, 1959

2,917,077

EXCESS FLOW CHECK VALVE

Norman E. Ziege, Bartlesville, Okla., assignor to Phillips Petroleum Company, a corporation of Delaware Application November 9, 1953, Serial No. 390,836

3 Claims. (Cl. 137—514.7)

This invention relates to excess flow check valves. In one specific aspect it relates to excess flow check valves with dash pots to eliminate chattering and water hammer effects.

Excess flow valves are useful in hydrodynamic applications wherever it is desired to limit the rate of flow of liquids through pipes and to stop, or substantially stop, the flow of liquid whenever a predetermined maximum flow rate is reached. One important application of such valves is in the outlet line from a tank of liquefied petroleum gas. In such a system it is important that the flow be stopped if a break should occur which permits the liquefied petroleum gas to escape into the atmosphere. An excess flow check valve can be incorporated in the system to stop this flow in an automatic manner if a leak should occur downstream from the valve. The typical excess flow valve employed for this purpose comprises a check valve wherein the valve head is retained off the valve seat by a suitable biasing means such as springs until a predetermined flow rate is established which overcomes the force of the biasing means and seats the valve head.

In the excess flow valves presently known in the art, the valve head is moved into engagement with the valve seat so suddenly there is produced what is known as "water hammer" in the pipe upstream of the valve. Water hammer is a series of shocks sounding like hammer blows that are produced by suddenly checking the flow of liquid in a pipe. If a valve, turbine gate or faucet is closed suddenly, the kinetic energy of the arrested column of liquid is expended, if no relief device is provided, in compressing the liquid and in stretching the pipe walls. Starting at the suddenly closed valve, a wave of increased pressure is transmitted back through the pipe with constant velocity and intensity. The shock pressure is not concentrated at the valve, but if a bursting pressure is produced it may show its effects near the valve simply because it acts there first. If the pipe is perfectly rigid, the velocity of the pressure wave is the same as the velocity of sound through the liquid. The increase in pressure is proportional to the destroyed velocity of flow and to the speed of propagation of the pressure wave.

When the pressure wave has traveled upstream to the end of the pipe where there is a reservoir or a large main (the whole pipe then being under increased pressure with checked flow throughout), the elasticity of the compressed liquid and that of the distended pipe reverse the flow and a wave of normal pressure (that of the reservoir or main) travels back downstream. When this wave of normal pressure reaches the valve, the kinetic energy of the column of water with reversed flow tends to create a vacuum at the valve. This checks the reverse flow and the checking proceeds progressively upstream accompanied by a wave of sub-normal pressure. When this latter wave reaches the upstream end (the whole pipe then being under sub-normal pressure), the greater normal pressure in the reservoir or large main starts flow into the pipe and a wave of normal pressure and forward flow travels downstream to the valve. When this wave reaches the valve there is forward flow throughout the pipe, the conditions being the same as when the valve was closed suddenly, and a wave of increased pressure and of checked flow again starts upstream. A complete cycle of pressure waves and reversals of flow occupy the time required for two round trips. The amplitude of the pressure vibrations becomes less with suceeding cycles because of friction but the time interval remains constant.

In an excess flow valve of the type previously described, the valve is alternately pulled upon and shut by the water hammer forces, resulting in continued chattering and banging, and often does not close permanently for a long period oftime. This chattering and banging caused by the water hammer continues without being dampened to any appreciable extent because each time the valve is opened by the sub-normal pressure upstream therefrom there is an additional flow of liquid through the valve which adds energy to the system to make the valve act as a liquid motor. This adds enough energy to the system to overcome the frictional losses such that instead of the water hammer effect dying out in a series of diminishing blows, the hammering may continue indefinitely until the valve or pipe is ruptured.

In accordance with the present invention there is provided an improved excess flow check valve that incorporates a dash pot to dampen movement of the valve head on and/or off the valve seat to reduce chattering and water hammer effects. In one embodiment of the improved excess flow check valve of this invention a piston is attached to the valve stem. A cylinder is attached to the valve body and encloses the piston such that there is a very small clearance between the cylinder and piston. In this manner, movement of the piston through the cylinder exerts a damping effect on the valve head because the piston tends to compress fluid in the cylinder or create a vacuum therein depending upon the direction of movement. This exerts a damping effect which is overcome only by the slow leakage of fluid between the piston and cylinder.

Accordingly, it is an object of this invention to provide an improved excess flow check valve that minimizes the effect of chattering and water hammer.

Another object is to provide an excess flow check valve equipped with a dash pot.

A further object is to provide an excess flow check valve of simple and rugged structure which operates in a positive manner to prevent excessive flow rates therethrough.

Various other objects, advantages and features of this invention should become apparent from the following detailed description taken in conjunction with the accompanying drawing in which.

Figure 1:
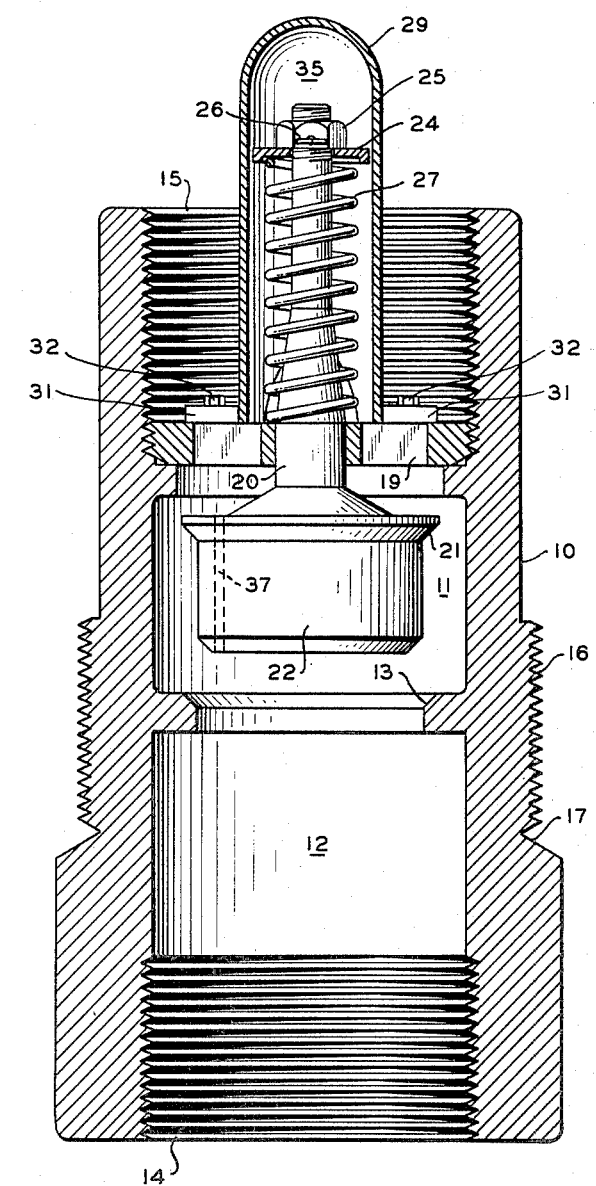
Figure 1 is a view, shown partially in section, of a first embodiment of the excess flow check valve of this invention.

Referring now to the drawing in detail and to Figure 1 in particular, there is shown a valve body 10 having a central passage therethrough which is divided into an inlet chamber 11 and an outlet chamber 12 by a valve seat 13. Chamber 12 is provided with a threaded portion 14 into which an outlet pipe, not shown, can be threaded. Chamber 11 is provided with a threaded portion 15 into which an inlet pipe, not shown, can be threaded. The exterior of body 10 is provided with a threaded portion 16 such that the valve assembly can be threaded directly into a tank or conduit if desired. Valve body 10 also is provided with a groove 17 which encompasses the body at a point downstream from valve seat 13 such that the body is weakened at this point and will thus break downstream from the valve seat if the valve is damaged accidentally. A spider 19 is threaded into inlet chamber 11 and a valve stem 20 is positioned for movement through the central passage of spider 19. A valve head 21 is attached to the downstream end of valve stem 20 to engage valve seat 13 in one position to block the passage of fluid between inlet chamber 11 and outlet chamber 12. Valve head 21 can be provided with a cylindrical nose 22 which extends through the central opening in valve seat 13 when valve head 21 is moved into engagement with valve seat 13.

A circular piston 24 is secured to the upstream end of valve stem 20 by a nut 25 which is threaded to the valve stem, and a cotter pin 26 extends through a small hole in nut 25 and valve stem 20 to retain nut 25 in position. A compression spring 27 is interposed between spider 19 and piston 24 to retain valve head 21 off valve seat 13, thereby permitting passage of fluid through the valve. A cylindrical cover 29 encloses piston 24. Cover 29 is provided with a plurality of legs 31 which are attached to spider 19 by suitable means such as screws 32. The upper end of cover 29 is closed. The inside diameter of cover 29 is only slightly larger than the outside diameter of piston 24 such that a narrow clearance exists between these members. In this manner, movement of piston 24 through cover 29 is substantially impeded by the pressure differential created across piston 24.

Figure 3:
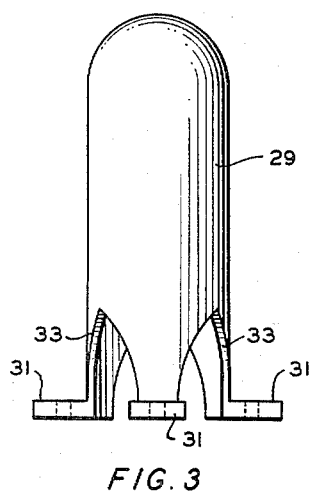
Figure 3 is an elevational view of the cylindrical cover employed in the valve of Figure 1.

As illustrated in greater detail in Figure 3, cover 29 preferably is provided with a plurality of slotted openings 33 in the bottom thereof which increase the area of the fluid passage through valve body 10. These openings 33 are not essential to satisfactory operation of the valve assembly, but have been found to be useful because cover 29 tends to restrict the area of fluid passage through spider 19.

The operation of the valve assembly thus far described should now become apparent. In normal operation, liquid flows through the valve assembly from chamber 11 to chamber 12 because valve head 21 is retained in a position off valve seat 13 by the force of compression spring 27. This liquid flow tends to force valve head 21 into a seated position, but such force normally is overcome by the force of spring 27. However, when the flow of liquid through the valve reaches a predetermined excessive rate, which can be caused by a break in the pipe system downstream from the valve, for example, the pressure differential across the valve is sufficient to overcome the force of spring 27. This results in valve head 21 being seated on valve seat 13. The instant that nose 22 enters the opening in valve seat 13, the flow through the valve is greatly reduced in a rather sudden manner. However, the entry of nose 22 into seat 13 does not cause water hammer because the valve head assembly can still move to completely close the valve, and some fluid will flow through the valve until this closure is completed.

The combined effects of the inertia of the valve head assembly, the force of spring 27 and the damping effect of the movement of piston 24 through cylinder cover 29 are sufficient to resist the complete closing of the valve until sufficient time has elapsed to prevent water hammer. It should be apparent that movement of the valve head assembly toward its seated position is impeded by the damping action of piston 24 in cover 29. Any sudden movement of piston 24 tends to create a partial vacuum in the chamber 35 within cover 19 above piston 24. This partial vacuum resists further movement of the piston until sufficient fluid leaks into chamber 35 around the periphery of piston 24 to equalize the pressure across piston 24.

In like manner any forces tending to remove valve head 21 from valve seat 13 are impeded by the damping effect of piston 24 moving through cover 29. Movement of valve head 21 in this latter direction tends to compress the fluid within chamber 35. This compression resists movement of the piston until the fluid leaks out of chamber 35. Thus, the damping effect of the dash pot assembly of piston 24 and cover 29 functions to retard movement of the valve head assembly in either direction so as to eliminate water hammer effect which may be generated by the sudden closing of the valve due to an excess pressure drop thereacross. Excellent results have been obtained in a 1½ inch valve when the inside diameter of cover 29 was not more than 0.010 inch larger than the outside diameter of piston 24.

Figure 2:
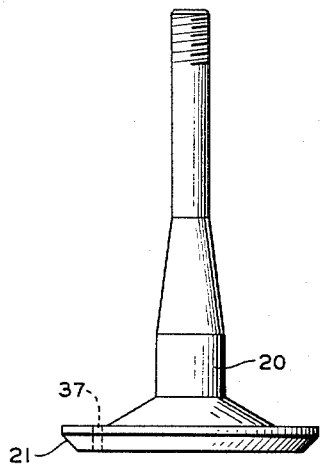
Figure 2 is an elevational view of a valve head and stem assembly which can be incorporated in the valve of Figure 1.

In Figure 2 there is shown a modified form of valve head assembly without a cylindrical nose 22 being attached to valve head 21. For some applications of the excess flow check valve of this invention the additional retarding effect of nose 22 is not needed, and the nose can be eliminated.

If desired, valve head 21 and nose 22 can be provided with a pinhole 37 such that some leakage can take place between chamber 12 and chamber 11 when the valve head is in a seated position. This leakage may be desired in order that spring 27 can reopen the valve when there is no flow downstream from the valve. Such pinholes are common features of excess flow valves, but may be eliminated if it is not objectionable in the system to have a rough seat 13 which allows some leakage. Pinholes also are not needed in systems wherein it is possible to increase the downstream pressure when it is desired to reopen the excess flow check valve. In these latter systems it is not necessary to have any leakage at all through the valve assembly.

Figure 4:
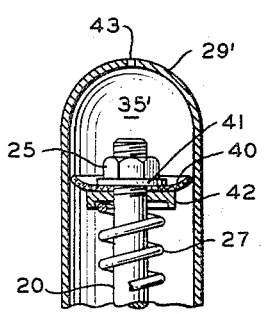
Figure 4 illustrates a modified form of dash pot assembly which can be incorporated in the valve of Figure 1.

In Figure 4 there is shown a modified form of the dash pot assembly. Piston 24 is replaced by a cup-shaped packer 40 which is attached to the upstream end of valve stem 20 by a pair of washers 41 and 42 which are retained in position by nut 25. Enclosing packer 40 is a cylindrical cover 29' which is provided with a small bleed opening 43 in the upper end thereof. Packer 40 preferably is constructed of a semi-flexible material such as leather or synthetic rubber, and is of slightly greater free diameter than the inner diameter of cover 29'. The outer edge of packer 40 is bent upwardly such that downward movement of valve stem 20 through cover 29' is impeded very little by packer 40 because of the tendency of the packer to bend upwardly and allow passage of fluid into chamber 35' in cover 29'. However, upward movement of valve stem 20 through cover 29' is substantially impeded by the resulting compression force exerted on the fluid in chamber 35'. However, the fluid in chamber 35' can slowly bleed out through port 43 to enable the valve head assembly to be moved upwardly at a slow rate. The dash pot assembly of Figure 4 thus prevents bouncing of the valve head on the valve seat and the resulting chattering and water hammer effect.

While the terms "up" and "down" have been employed in describing the construction and operation of the valves of this invention, it should be apparent that these terms have been employed merely to simplify the explanation. The valves obviously can be operated in any desired position.

While this invention has been described in conjunction with present preferred embodiments thereof, it should be apparent that the invention is not limited thereto.

What is claimed is:

1. An excess flow check valve comprising a body having an inlet and an outlet with a passage therebetween defining a fluid flow path, a valve seat in said body, a valve head in said body moveable toward and away from said seat to control the flow of fluid through said passage, said valve head being provided with a passage which communicates with said inlet and outlet when said valve head is in its seated and unseated positions, a nose attached to said valve head and protruding therefrom toward the outlet of said passage, said nose being slightly smaller than the opening through said valve seat, a spring tending to maintain said valve open by biasing said valve head away from said valve seat toward the inlet of said passage with a force that is overcome by a predetermined rate of flow of fluid through said passage from the inlet thereof to the outlet thereof, a piston attached by a solid, non-fluid conducting valve stem to said valve head in spaced relation therewith, and a cylinder enclosing said piston, said cylinder being closed at one end adjacent said inlet, said piston being in closely spaced relation with the wall of said cylinder such that movement of said piston through said cylinder is dampened, whereby dampening action is effected up to the moment said valve head is seated and imediately after it is unseated.

2. An excess flow check valve comprising a body having an inlet and an outlet with a passage therebetween defining a fluid flow path, a valve seat in said body, a spider in said body upstream from said valve seat, a valve head in said body, said valve head being provided with a passage which communicates with said inlet and outlet when said valve head is in its seated and unseated positions, a valve stem attached to said valve head and extending through a central opening in said spider whereby said valve head is movable toward and away from said seat to control the flow of fluid through said passage, a piston attached to said valve stem in spaced relation with said valve head, a compression spring interposed between said spider and said piston and tending to maintain said valve open by biasing said valve head away from said valve seat toward the inlet of said passage with a force that is overcome by a predetermined rate of flow of fluid through said passage from the inlet thereof to the outlet thereof, and a cylinder enclosing said piston, one end of said cylinder being attached to said spider, the second end of said cylinder adjacent said inlet being closed, said piston being in closely spaced relation with the inner wall of said cylinder such that movement of said piston through said cylinder is dampened, whereby dampening action is effected up to the moment said valve head is seated and immediately after it is unseated 3. The combination in accordance with claim 2 wherein a plurality of openings are formed in said cylinder near the end thereof which is attached to said spider, said openings disposed between and above the radial spokes of said spider, whereby the cross-sectional area of fluid passage through said body is increased in the region of said spider.

References Cited in the file of this patent
UNITED STATES PATENTS

| | | |
|---|---|---|
| 547,506 | Sleigh | Oct. 8, 1895 |
| 943,577 | Stotts | Dec. 14, 1909 |
| 1,153,850 | Meier | Sept. 14, 1915 |
| 2,307,949 | Phillips | Jan. 12, 1943 |
| 2,354,161 | Waterman | July 18, 1944 |
| 2,445,612 | Fanshier | July 20, 1948 |
| 2,554,390 | Stevenson | May 22, 1951 |
| 2,583,295 | Greer | Jan. 22, 1952 |
| 2,591,060 | Garretson | Apr. 1, 1952 |
| 2,781,775 | Merrill | Feb. 19, 1957 |